United States Patent
Fevre et al.

(10) Patent No.: US 8,678,939 B2
(45) Date of Patent: Mar. 25, 2014

(54) BALL-TYPE COUPLING DEVICE FOR COUPLING TWO SLIDING SHAFTS WITH PIVOTING SUPPORT

(71) Applicants: Laurent Fevre, Saint-Sulpice (FR); David Capela, Busloup (FR)

(72) Inventors: Laurent Fevre, Saint-Sulpice (FR); David Capela, Busloup (FR)

(73) Assignee: ZF Systemes de Direction NACAM, S.A.S. (FR)

( * ) Notice: Subject to any disclaimer, the term of this patent is extended or adjusted under 35 U.S.C. 154(b) by 0 days.

(21) Appl. No.: 13/682,396

(22) Filed: Nov. 20, 2012

(65) Prior Publication Data
US 2013/0079165 A1 Mar. 28, 2013

Related U.S. Application Data

(63) Continuation of application No. PCT/EP2011/058214, filed on May 19, 2011.

(30) Foreign Application Priority Data

May 20, 2010 (FR) ...................................... 10 53929

(51) Int. Cl.
*F16C 3/035* (2006.01)
(52) U.S. Cl.
USPC ............................................ 464/167; 384/54

(58) Field of Classification Search
USPC .................................. 464/167; 384/49, 54, 55
See application file for complete search history.

(56) References Cited

U.S. PATENT DOCUMENTS

| 2006/0039747 A1 | 2/2006 | Shoda et al. |
| 2006/0053934 A1 | 3/2006 | Bahr et al. |
| 2011/0098121 A1 | 4/2011 | Bahr et al. |

FOREIGN PATENT DOCUMENTS

| EP | 1167790 A1 | 1/2002 |
| EP | 1566324 A1 | 8/2005 |
| FR | 2795787 A1 | 1/2001 |
| WO | 2009153417 A1 | 12/2009 |

OTHER PUBLICATIONS

International Search Report Application No. PCT/EP2011/058214 Completed: Jun. 17, 2011 Mailing Date: Jun. 28, 2011 3 page.

*Primary Examiner* — Gregory Binda
(74) *Attorney, Agent, or Firm* — St. Onge Steward Johnston & Reens LLC

(57) ABSTRACT

Device for coupling an inner shaft and an outer shaft which slide along their common axis with balls positioned between the two shafts. The balls rest directly in axial grooves of the outer shaft and on two rails positioned in axial grooves of the inner shaft. The two rails pivot about the balls, by pressing against flanks of mating curved profile of the axial groove, and are held in place by an elastic element which presses against the bottom of the axial groove.

23 Claims, 7 Drawing Sheets

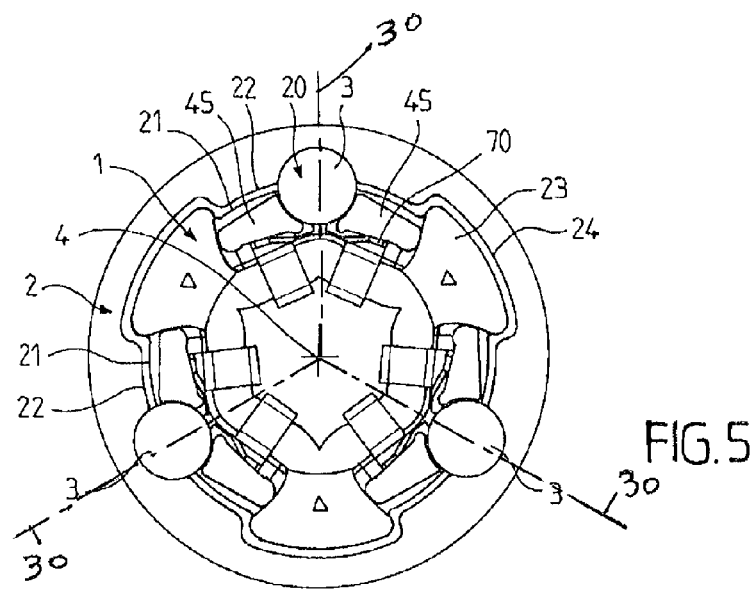
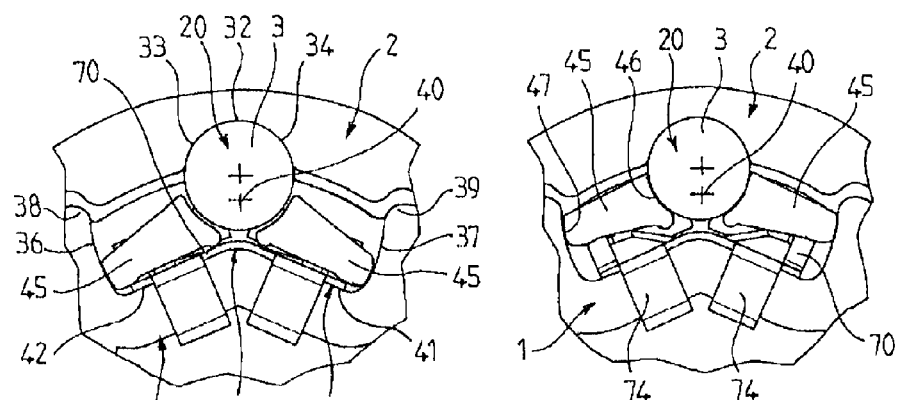 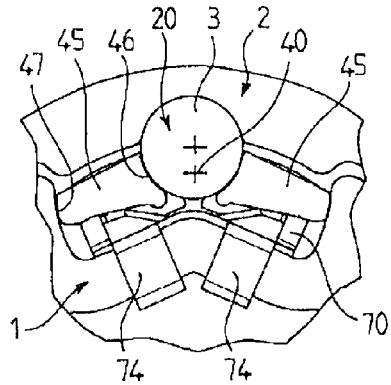
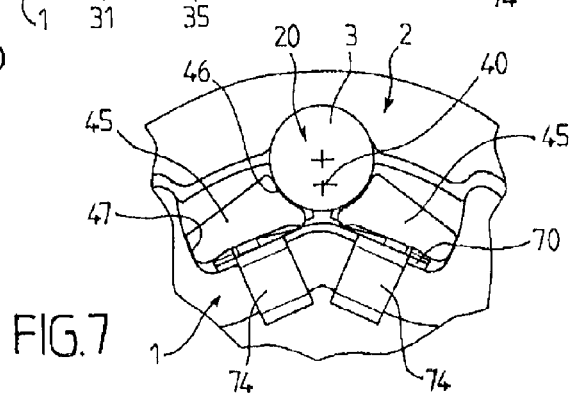

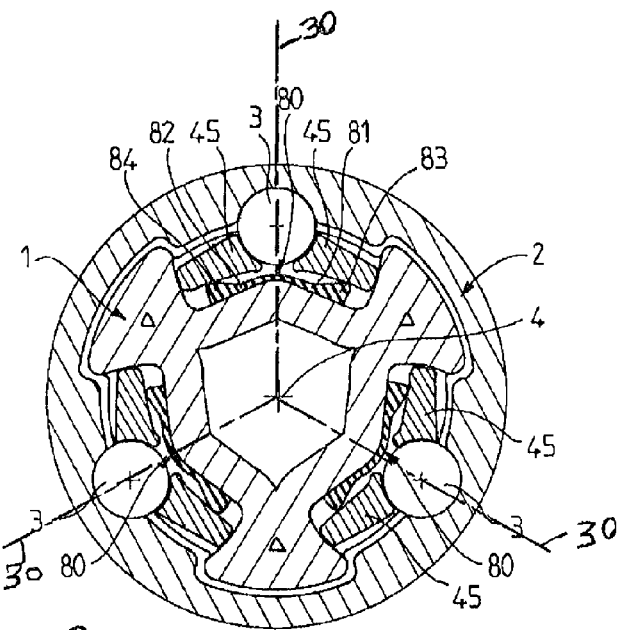
FIG.17
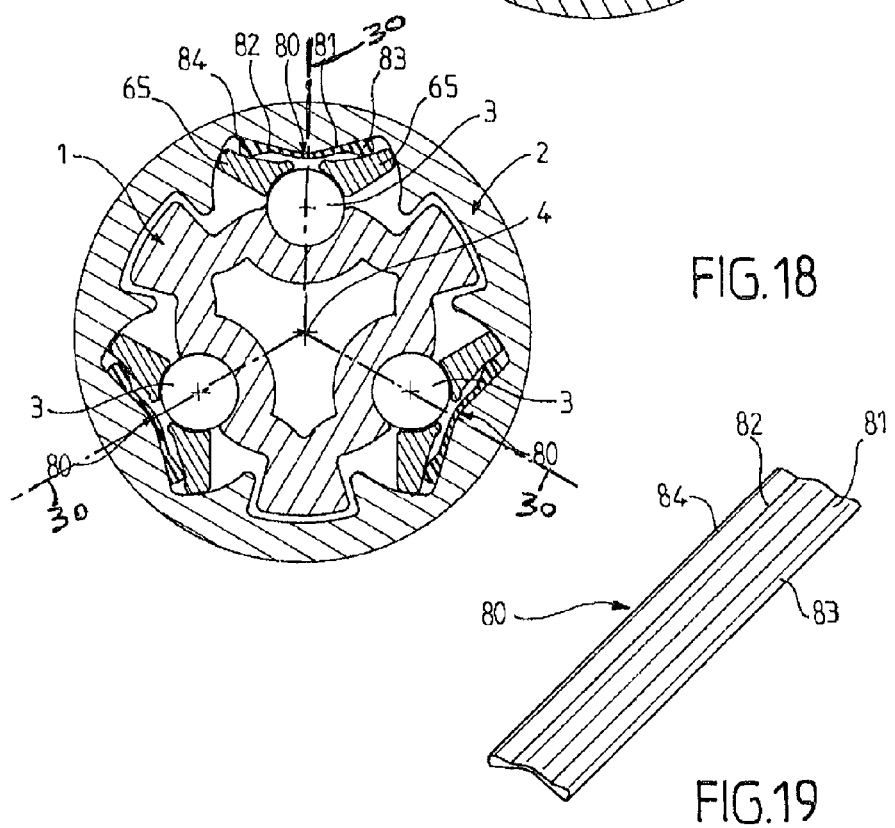
FIG.18
FIG.19

BALL-TYPE COUPLING DEVICE FOR COUPLING TWO SLIDING SHAFTS WITH PIVOTING SUPPORT

FIELD OF THE INVENTION

The invention relates to a rotatable coupling device for two shafts sliding along their common axis. The coupling device of the invention is applied to a motor vehicle steering column, by adapting it to the intermediate column portion connected to the steering gear case, or to the upper column portion connected to the steering wheel.

BACKGROUND OF THE INVENTION

Vehicle steering columns are assembled from a number of universal or Cardan joints. Typically, an intermediate axis of a steering column has a Cardan joint at each end: one Cardan joint is connected to the motion input of the steering gear case, and the other Cardan joint is connected to the upper column. In order for the steering mechanism to function properly, the length of the intermediate axis must be variable. The variability of the intermediate column is adapted to oscillations of the front of the vehicle. These oscillations are due to the profile and the surface condition of the road. A variable length of the intermediate axis is also required in order to facilitate the assembly of the rack pinion, and to absorb motions of a front impact.

There exist many sliding shaft coupling devices, which transfer torque between the shafts by using splines, which are provided on each of the two shafts with curved profiles. However, this type of device develops wear over the life of the vehicle. In order to delay the occurrence of this wear, many prior art sliding shaft coupling devices use very tight tolerances between the shafts during manufacture. The tight tolerancing requires a relatively large axial force for proper assembly, hence a longer assembly time and more labor required to assemble the coupling device.

There also exist coupling devices which use plastic injection on splined portions belonging to a male metal shaft and a female metal tube. This solution poses problems for absorbing axial movements when the torque on the shaft is high, as the sliding forces increase proportionally with the friction forces between both splined portions. Moreover, the wear of the plastic parts leaves play between the shafts, which causes deteriorated performance of the coupling device.

As a last solution, rolling elements and strain springs may be introduced between the shaft and the tube. This solution is satisfactory for the sliding, under a torque with a relatively low axial force, but it poses problems in terms of angular rigidity because the torsional stiffness is directly proportional to the stiffness of the pre-tensioning of the springs.

The axial variability of the column should be accurate so as to allow proper absorption of the axial movements. In current coupling devices, the axial force is a function of the torque to be transmitted. There is an increased sliding force with an increased torque, which is related to the friction coefficient. With a sudden axial release, jerks can occur. These jerks are detrimental to maintaining proper adjustment of the axial sliding while maintaining reduced rotational play. The jerks are further harmful to driving and handling performance.

There is a need for an improved coupling device with a variable length that overcomes the disadvantages of the prior art. Further, a function is required for transmitting the rotary movement between both shafts and for the torque necessary for maneuvering the vehicle.

SUMMARY OF THE INVENTION

The object of the invention is to propose a coupling device for a sliding shaft which avoids the drawbacks of the prior art. Therefore, it is desirable to create a coupling device where the axial sliding resistance is more constant for a range of torque imposed upon the coupling device. The axial force should therefore experience a very small increase when the torque to be transmitted increases. At the same time, there must be sufficient angular rigidity to accomplish transmission of torque inputs.

Another object of the present invention is to provide an improved coupling device with improved wear characteristics and reduced play between the inner and outer shafts over the life of a vehicle.

Another object of the present invention is to provide an improved coupling device that may be easily mounted on existing motor vehicles by reducing the axial force required for installation.

Yet another object of the invention is to provide an improved coupling device where elastic members are not involved in the transmission of the torque, in order to preserve high angular rigidity of the coupling device.

These and other objects are achieved by providing a device for coupling two shafts: an inner shaft and an outer shaft which slide into each other along the direction of their common axis. The coupling device for two shafts includes balls, which are arranged between the inner shaft and the outer shaft. In the coupling device, each of the balls is arranged in a concave portion of the inner shaft and a concave portion of the outer shaft. Each of the balls moves along two rails arranged on either side of a median plane passing through the common axis and through the center of the balls. Each of the two rails engages with the concave portion of one of the two shafts and pivots around each of the balls. Each rail is parallel to the common axis. Each of the two rails is pushed against each of the balls by an elastic element arranged and bearing on the concave portion; each of the balls moves directly against the concave portion of the other shaft.

The assembly is carried out so that at rest, there is no torque transmission. When there is torque transmission, each of the balls is in contact on either side of the median plane through a bearing area with the corresponding rail arranged in the concave portion of one of the two shafts, the rails pivoting around the balls. The assembly is also carried out so that each of the rails is always in contact with the bearing area of the concave portions, which are laid out to compensate for the play and to keep the rails from escaping the concave portions on either side of the balls. Each of the balls is always in contact with a bearing area with the concave portion of the other shaft.

According to the invention, the concave portion of the shaft receives both rails, and includes a bottom with flanks arranged on either side of the median plane, the flank having a circular section. The center of the section is located in the median plane at a slight distance from the center of the ball and closer to the bottom than the center of the ball, so as to keep the rails within the concave portion of the shafts that is to either side of the balls. Both flanks have a slight bulge at the junction of the sliding face of the shaft.

According to the invention, upon transmitting the torque, the force transmitted between the rail and the corresponding flank should be located inside the friction cone in order to avoid any sliding of the rail. Further, both bearing and contact faces between each of the two rails and each of the balls and each of the two flanks are faces having curved profiles in order to avoid high contact pressure.

In order to increase the operating safety of the coupling device of the invention, male grooves and female grooves with curved profiles having some clearance, are laid out on the inner shaft and on the outer shaft, so that in the case that the balls fail, the torque may still be transmitted between the inner shaft and the outer shaft.

Several structures of the coupling device may be elaborated. In one embodiment, the elastic members are arranged in the inner shaft. In another embodiment, the elastic members are arranged in the outer shaft. In yet another embodiment, the elastic members are arranged in both the inner and outer shafts.

In one embodiment of the present invention, the coupling device has balls which are arranged in one or several axial rows. For each row of balls, a concave portion is laid out in the outer shaft as an axial groove, the section of which includes two concave faces tilted with respect to each other, which will come into contact with the balls. A concave portion is laid out in the inner shaft as an axial groove, a section of which includes a bottom and two flanks, both flanks having a circular section, the center of which is on the median plane passing through the common axis and through the axis of the centers of the balls of said row; said center being closer to said bottom than the center of the ball. Two rails are arranged on either side of the median plane and cooperate with the concave portion in the form of an axial groove of the inner shaft. Each rail has the shape of an axial bar, the section of which has an internal bearing face and an external bearing face.

The internal bearing face has a concave shape so as to come into contact with the relevant portion of the balls, through a curved profile. The external bearing face has a convex shape in order to come into contact with the corresponding flank with a concave shape through a curved profile.

Each of the two rails is pushed by an elastic member including two axial bars tilted relatively to each other. Each bar bears upon a corresponding face of the bottom approximately perpendicular to the corresponding flank, so that the rails may pivot and rotate around the row of balls.

In another embodiment of the invention, the coupling device has balls which are arranged in one or more axial rows. For each row of balls, a concave portion in the form of an axial groove is laid out in the inner shaft. The section of the shaft includes two concave faces tilted with respect to each other, which come into contact with the balls. In the inner shaft, there is a concave portion with the shape of an axial groove. The section of the groove has a bottom and two flanks, both flanks have a circular section. The center of the circular section is on the median plane passing through the common axis and through the axis of the centers of the balls, the center of the circular section being closer to the bottom than to the center of the balls.

For each row of balls, two rails are positioned on either side of the median plane. The rails contact the concave portion having the shape of an axial groove of the outer shaft. Each rail has the shape of an axial bar, the section of which has an internal bearing face and an external bearing face. The internal bearing face has a concave shape that contacts the relevant portion of the balls through a curved profile. The external bearing face has a convex shape that contacts the corresponding flank of concave shape through a curved profile.

Each of the two rails is pushed by an elastic member including two axial bars tilted with respect to each other. Each bar bears upon a corresponding face of the bottom approximately perpendicular to the corresponding flank, so that the rails may pivot and rotate around the row of balls.

According to alternate embodiments of the invention, the elastic member is metal and includes two axial bars tilted with respect to each other. Each axial bar has elastic tabs which push the corresponding rail by bearing upon the corresponding face of the bottom. The rails have an attachment member at each axial end.

In other embodiments of the invention, the elastic member is in an elastic material and includes two bars tilted with respect to each other. Each axial bar has an axial bulge which pushes the corresponding rail by bearing upon the corresponding face of the bottom.

According to another embodiment of the coupling device of the invention, the balls are arranged in a first axial row, the inner shaft having with an axial groove and the outer shaft having with an axial groove. The device including another row of balls which is diametrically opposite to the first row of balls and which are directly supported in an axial groove of the inner shaft and in an axial groove of the outer shaft.

According to another embodiment of the coupling device of the invention, the balls are arranged in two diametrically opposite axial rows. The inner shaft having with two diametrically opposite axial grooves, and the outer shafts having with two diametrically opposite axial grooves.

According to another embodiment of the coupling device of the invention, the balls are arranged in three axial rows which are transversely positioned at 120° with respect to each other. The inner shafts have three axial grooves, which are arranged transversely at 120° with respect to each other. The outer shafts have with three axial grooves, which are arranged transversely at 120° with respect to each other.

The coupling device according to the invention is either applied to the intermediate portion of a steering column of a motor vehicle, or to the upper portion of a steering column of a motor vehicle.

The device for coupling two shafts along their common axis according to the invention thus has the advantage of always having two bearing areas for each of the two inner and outer shafts and for each row of balls, which are always in contact even if there is no transmission of a torque.

Further, there is a reduced axial force which is required for assembly. The accurate variability in length of the coupling device of the invention gives the possibility of avoiding axial jerks during the driving of the vehicle, and guarantees enhanced wear characteristics while avoiding the occurrence of coupling play. Further, when torque is transmitted through the device, the axial force necessary to vary the length is considerably reduced because of the rolling and sliding contact. Additionally, the torque transmission is not directly influenced by the elastic members, because the elastic members are not involved in the transmission of the torque. This allows the coupling device to retain strong angular rigidity during torque transmission. The coupling device may also be easily mounted in existing motor vehicle steering columns.

BRIEF DESCRIPTION OF THE DRAWINGS

Other features and advantages of the present invention will become more clearly apparent upon reading the following description of several embodiments of the invention, given as non-limiting examples, with reference to the corresponding drawings.

FIG. 5 is a cross-sectional view of another embodiment of the invention with three rows of balls in the inner shaft.

FIGS. 6, 7, 8 are detailed views of a row of balls of FIG. 5, with an alternate position of the two rails.

FIG. 17 is a cross-sectional view of another embodiment of the invention with three rows of balls in the inner shaft.

FIG. 18 is a cross-sectional view of another embodiment with three rows of balls in the outer shaft.

FIG. 19 is a perspective view of the elastic member illustrated in FIGS. 17 and 18.

DETAILED DESCRIPTION OF THE INVENTION

The invention relates to a rotatable coupling device for two shafts, the shafts sliding within each other along their common axis.

Figure 1:
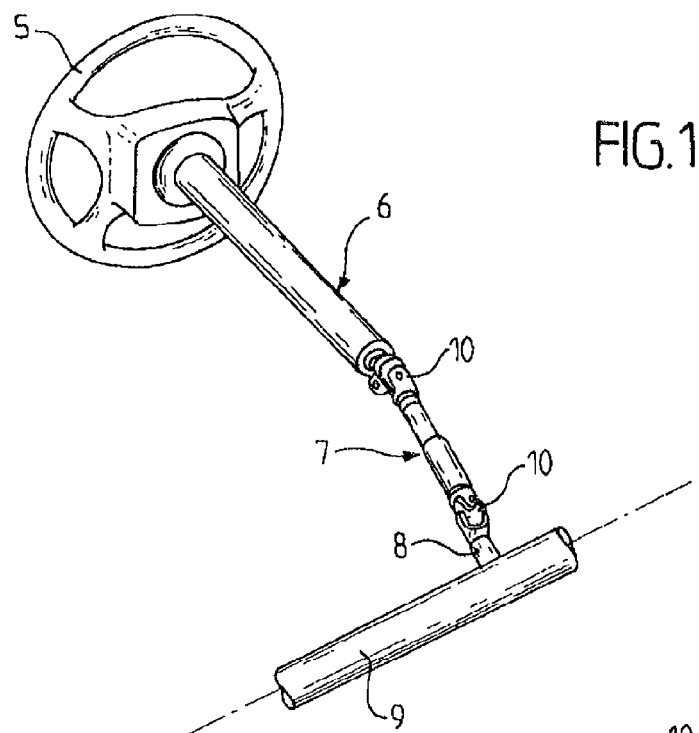
FIG. 1 is a schematic perspective view of a motor vehicle steering system, wherein the coupling device of the invention is applied to the intermediate column portion.

This coupling device is particularly well applied to a motor vehicle steering system, as the one which is schematically illustrated in FIG. 1.

FIG. 1 shows a steering system including a steering column with an upper column portion 6 also called upper column, and an intermediate column portion 7 also called intermediate axis. The upper column portion 6 is connected through its upper end to the steering wheel 5, and through its lower end to the intermediate column portion 7. The intermediate column portion 7 is connected through its upper end to the upper column portion 6, and through its lower end to the steering gear case 8 of the steering stem 9. The intermediate column portion 7 is connected at each of its ends by means of a Cardan joint hinge referenced as 10 for the upper column portion 6 and also referenced as 10 for the steering gear case 8.

Figure 2:
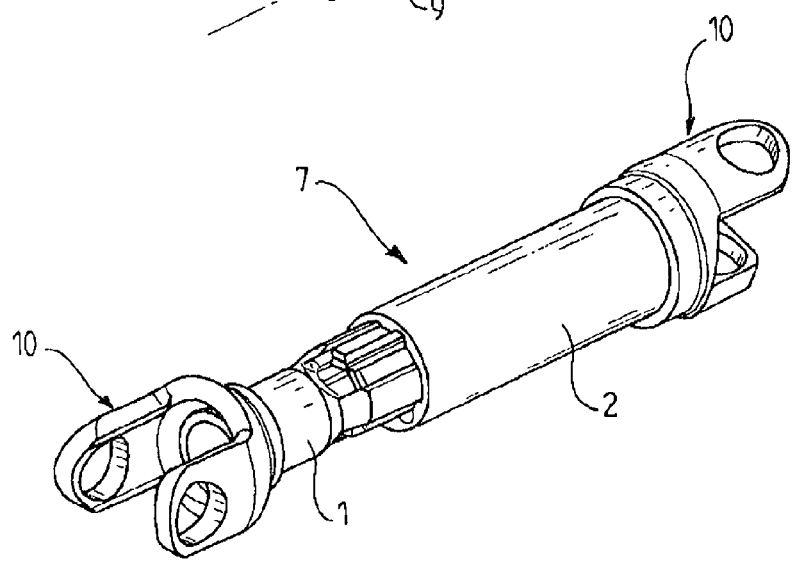
FIG. 2 is an axial perspective view of the intermediate column portion.
Figure 3:
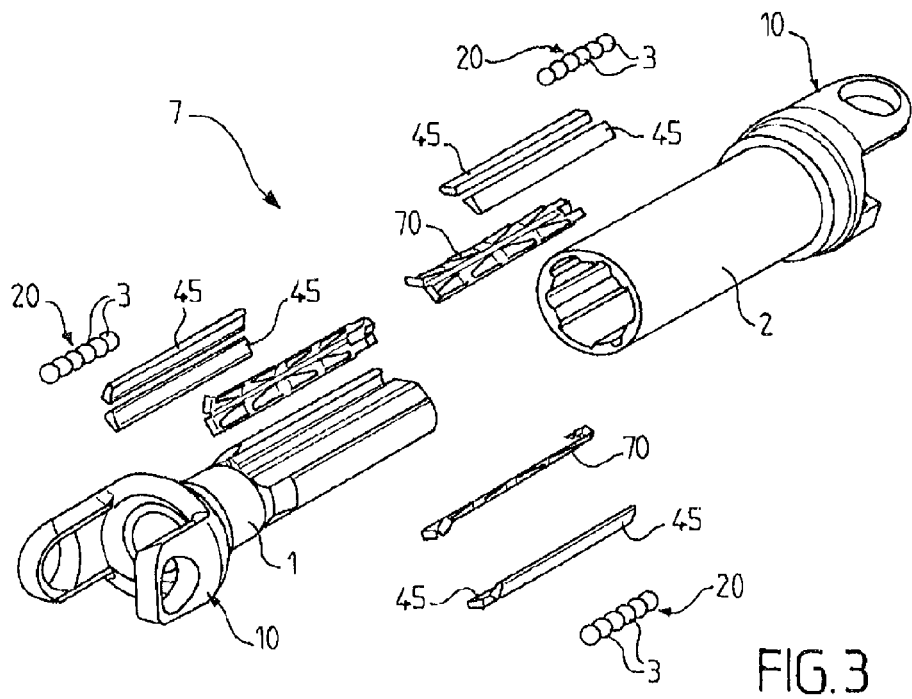
FIG. 3 is an exploded perspective view of FIG. 2.

FIGS. 2 and 3 show a coupling device which is made in the intermediate column portion 7. The coupling device of the invention may also be made in the upper column portion 6. An inner shaft 1 and an outer shaft 2 slide within each other along the direction of their common axis 4. The device for coupling both shafts includes balls 3 in the different embodiments described hereafter. The balls 3 are arranged between the inner shaft 1 and the outer shaft 2. In the coupling device of the invention, each of the balls 3 is arranged in a concave portion of the inner shaft 1, and in a concave portion of the outer shaft 2. Each of the balls 3 moves on two rails which cooperate with the concave portion of one of the two shafts, which pivot around the balls 3 and which are parallel to the common axis 4. Each of the two rails is pushed against each of the balls 3 by an elastic member, which is arranged and supported in the concave portion. Each of the balls 3 moves against the concave portion of the other shaft. The coupling device according to the invention is laid out so that whether or not there is torque transmitted through the coupling device, the balls 3 are always in contact with a bearing area with the corresponding rail. The rail is arranged in the concave portion of one of the two shafts and pivots around the ball 3 according to an essential feature of the invention. According to another essential feature of the invention, each of the rails is in contact through a bearing area with the concave portion, which is arranged so as to compensate for all the clearances due to manufacturing tolerances and to avoid escape of each other two rails; each of the balls 3 always being in contact through a bearing area with the concave portion of the other shaft.

The whole of the intermediate portion 7 is illustrated in perspective in FIG. 2 and in an exploded view in FIG. 3. The inner shaft 1 and the outer shaft 2 slide with the balls 3 along their common axis 4. The intermediate column portion 7 is connected to the steering gear case 8 through the Cardan joint 10, and it is connected to the upper column portion 6 through the Cardan joint 10.

Figure 4:
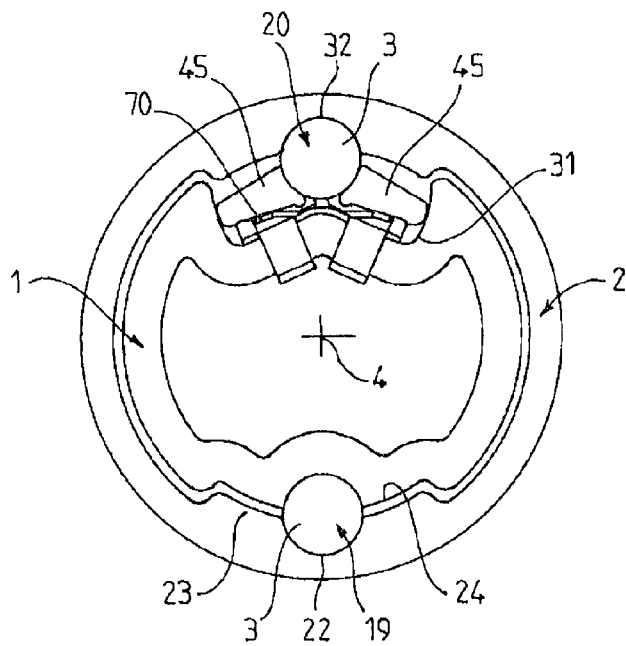
FIG. 4 is a cross-sectional view of an embodiment of the invention with a single row of balls in the inner shaft.
Figure 11A:
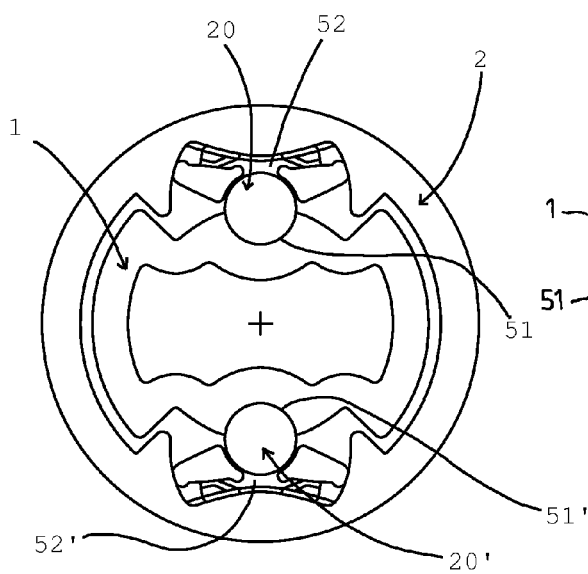
FIGS. 11A and 11 are cross-sectional views showing a coupling device with two rows of balls, similar to FIG. 4.
Figure 11:
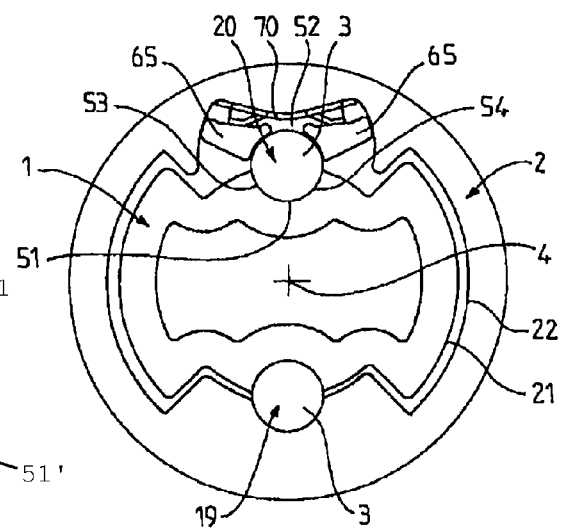

FIGS. 4 and 11 show the coupling device including balls 3 which are arranged in one or several axial rows: 1 axial row 2 axial rows are illustrated by similarity with FIGS. 4 and 11.

FIGS. 3, 5, 9, 15, 17 and 18 show the coupling device including 3 axial rows.

Figure 9:
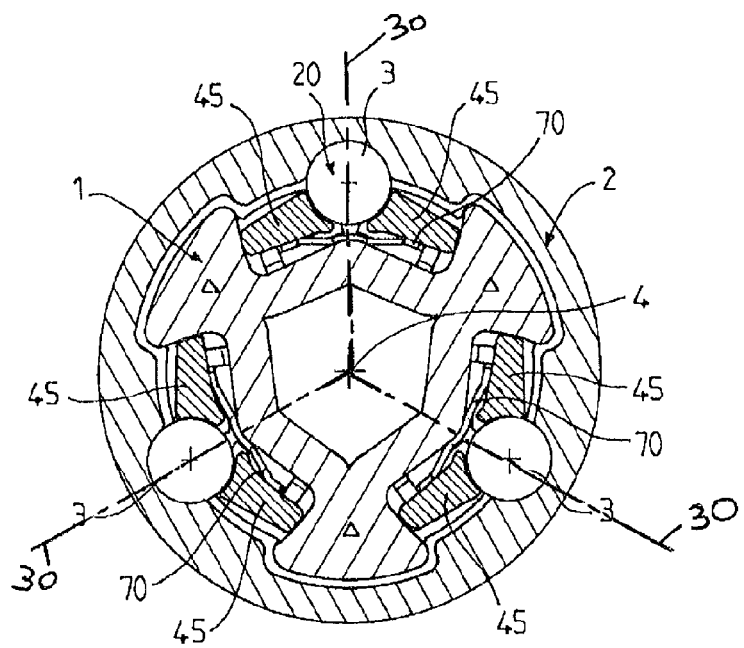
FIG. 9 is a cross-sectional view corresponding to FIG. 5, the rails being shown as a section.

FIG. 3 is an exploded view and FIGS. 5, 9 and 17 are sectional views of the coupling device including balls which are arranged in three axial rows 20. The axial rows 20 are located transversely at 120° with respect to each other. The inner shaft 1 is provided with three axial grooves 31 which are located transversely at 120° with respect to each other. The outer shaft 2 is provided with thee axial grooves 32, which are located transversely at 120° with respect to each other. For each row 20 of balls 3, a concave portion with the shape of an axial groove 32, the section of which includes two concave faces 33, 34 tilted with respect to each other, which come into contact with the balls 3, is made in the outer shaft 2. For each row 20 of balls 3, a concave portion with the shape of an axial groove 31, the section of which includes the bottom 35 and two flanks 36, 37 is made in the inner shaft 1. Both flanks 36, 37 have a circular section, the center 40 of which is on the median plane 30 passing through the common axis and through the axis of the centers of the balls 3 of the row 20. The center 40 is at a slight distance from the center of the ball and is closer to the bottom 35 than the center of the ball 3, so as to avoid escape of the two rails 45. Further, each flank 36, 37 includes a corresponding slight bulge 38, 39 which is outside each flank 36, 37 at the junction of the sliding face 21 of the inner shaft 1. For each row 20 of balls 3, there are two rails 45, which are arranged on either side of the median plane 30. The rails 45 cooperate with the concave portion with the shape of an axial groove 31 of the inner shaft 1. Each rail 45 has the shape of an axial bar, the section of which has an internal bearing face 46 and an external bearing face 47.

Figure 10:
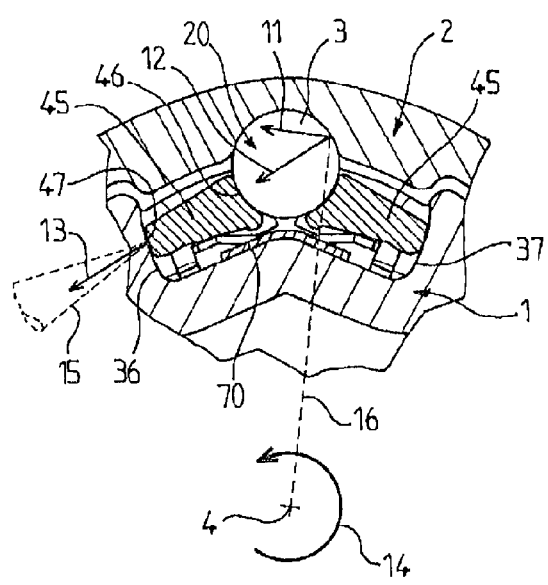
FIG. 10 is a detailed view of a row of balls of FIG. 9.

FIG. 10 shows the internal bearing face 46 has a concave shape and contacting the balls 3. The internal bearing face 46 has a curved profile contacting the balls 3. The external bearing face 47 has a convex shape and contacts the corresponding flank 36, 37 of the corresponding concave shape. The external bearing face 47 and the corresponding flanks 36, 37 have curved profiles. The curved profiles of the rail 45 and the flank 36, 37 along with the balls, allows for reduced contact pressure. Further, during transmission of the torque, the transmitted force between the rail 45 and the corresponding flank 36, 37 is located inside the friction cone of the contact faces, which avoids any sliding of the rail 45.

Each of the two rails 45 is pushed by an elastic member 70 (FIG. 16) or 80 (FIG. 19). The elastic member 70, 80 includes two axial bars 71, 72 or 81, 82 which are tilted with respect to each other. Each of the axial bars 71, 72 or 81, 82 bears upon a corresponding face 41, 42 of the bottom 35, which is approximately perpendicular to the corresponding flank 36, 37 so that the rails 45 may pivot and rotate around the row 20 of balls 3 for compensating all the clearances due to manufacturing tolerances. Various positions are illustrated in FIGS. 6 to 8: FIG. 6 during assembly, and FIGS. 7 and 8 for each of the extreme positions.

FIGS. 9, 15, 17 and 18 show the coupling device including balls 3 which are arranged in three axial rows 20. The axial rows 20 are located transversely at 120° with respect to each other. The inner shaft 1 is provided with three axial grooves 51, which are located transversely at 120° with respect to each other. The outer shaft 2 is provided with three axial grooves 52 which are located transversely at 120° with respect to each other.

For each row 20 of balls 3, a concave portion with the shape of an axial groove 51, the section of which includes two concave faces 53, 54 tilted with respect to each other, which come into contact with the balls 3, is laid out in the inner shaft. A concave portion with the shape of an axial groove 52, the section of which includes a bottom 55 and two flanks 56, 57 is laid out in the outer shaft 2. Both flanks 56, 57 have a circular section, the center 60 of which is on the median plane 30 passing through the common axis 4 and through the axis of the centers of the balls 3 of the row 20. The center 60 is at a slight distance from the center of the balls 3 and is closer to the bottom 55 than to the center of the ball 3, so as to avoid escape of the two rails 65. Further, each flank 56, 57 includes a slight corresponding bulge 58, 59 which is outside each flank 56, 57 at the junction of the sliding face 22 of the outer shaft 2.

There are two rails 65, which are arranged on either side of the median plane 30. The rails 65 cooperate with the concave portion with the shape of an axial groove 52 of the outer shafts 2. Each rail 65 has the shape of an axial bar, the section of which has an internal bearing face 66 and an external bearing face 67. The internal bearing face 66 has a concave shape and contacts the relevant portion of the balls 3. The internal bearing face 66 has a curved profile with the relevant portion of the balls 3. The external bearing face 67 has a convex shape that contacts the corresponding flank 56, 57 of concave shape. The corresponding external bearing face 67 and the flank 56, 57 have curved profiles. The curved profiles of the rail 65 with the portion of the balls 3 and the flanks 56, 57 give the possibility of having reduced contact pressure. Further, during transmission of the torque, the force transmitted between the rail 65 and the corresponding flank 56, 57 is located inside the friction cone of the contact faces, which avoids any sliding of the rail 65, as illustrated in FIG. 10.

Figure 12:
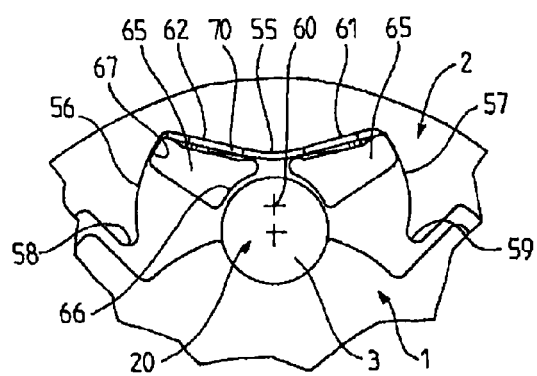
FIGS. 12, 13, 14 are detailed sectional views of a row of balls in the outer shaft, with an alternate position of the two rails.
Figure 13:
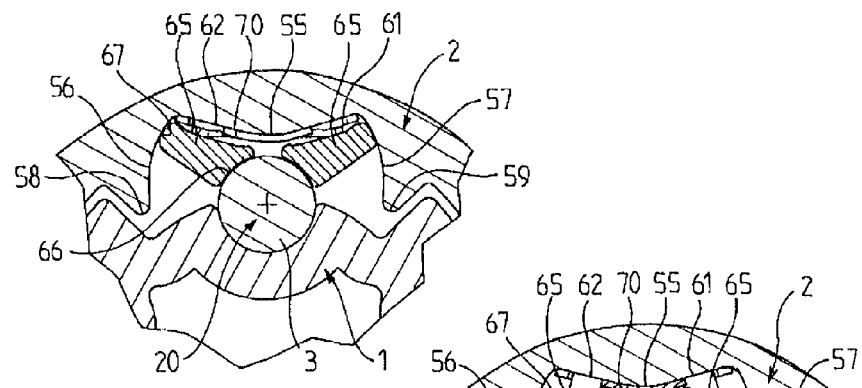
Figure 14:
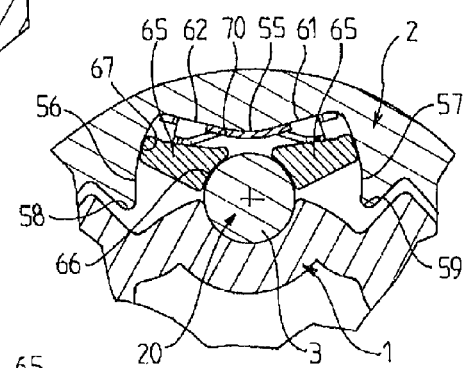
Figure 15:
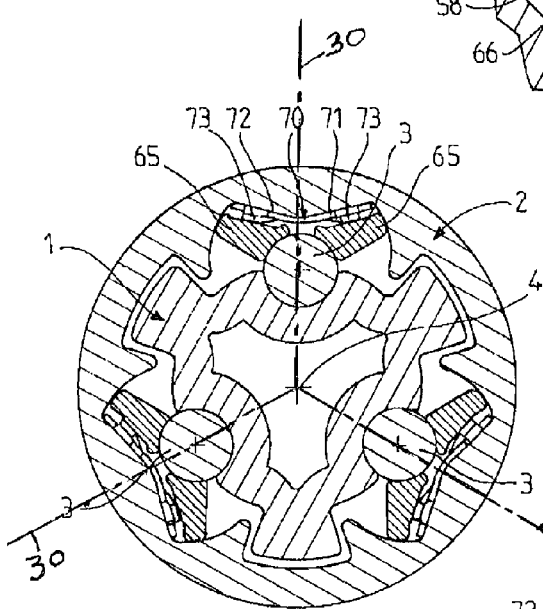
FIG. 15 is a cross-sectional view of the invention corresponding to FIGS. 12, 13, 14.

Each of the two rails 65 is pushed by an elastic member 70 (FIG. 16) or 80 (FIG. 19). The elastic member 70, 80 includes two axial bars 71, 72 or 81, 82 which are tilted with respect to each other. Each of the axial bars 71, 72 or 81, 82 bears upon a corresponding face 61, 62 of the bottom 55 which is approximately perpendicular to the corresponding flank 56, 57, so that the rails 65 may pivot and rotate around the row 20 of balls 3 for compensating all the clearances due to manufacturing tolerances. Various positions of the rails are illustrated in FIGS. 12, 13 and 14. FIG. 12 shows the position during mounting. FIG. 13 shows an extreme position and FIG. 14 shows an average position.

Figure 16:
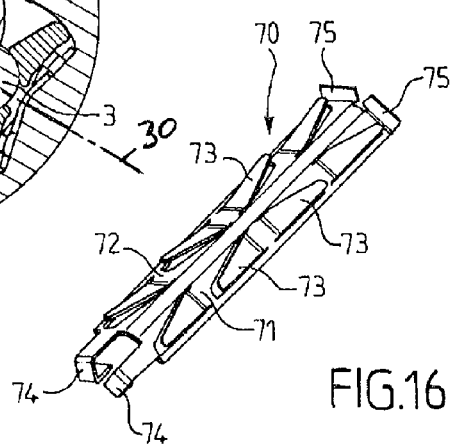
FIG. 16 is a perspective view of the elastic member illustrated in FIGS. 2 to 15.

Regardless of the embodiment illustrated in the figures, each of the two rails 45 or 65 may be pushed by an elastic member 70 or 80. The elastic member 70, illustrated in FIG. 16, is metal and includes two axial bars 71 and 72 which are tilted with respect to each other. Each axial bar 71 or 72 is provided with elastic tabs 73 which push the rail 45 or 65. Each axial bar 71 or 72 is provided with an attachment member 74 and 75 corresponding to each axial end, and then upon the corresponding face 41, 42 or 61, 62 of the bottom 35 or 55 as illustrated in FIGS. 3 to 16.

The elastic member 80 illustrated in FIG. 19 is an elastic material and includes two axial bars 81 and 82 which are tilted with respect to each other. Each axial bar 81 or 82 is provided with a corresponding axial bulge or boss 83 or 84 which pushes the rail 45 or 65, and it bears upon the corresponding face 41, 42 or 61, 62 of the bottom 35 or 55, as illustrated in FIGS. 17, 18 and 19.

FIGS. 4, 5, 11 and 15 show the inner shaft 1 has a sliding face 21 which is provided with male grooves 23 and the outer shaft 2 has a sliding face 22 which is provided with female grooves 24. The sliding face 21 of the inner shaft 1 corresponds to the external face of the inner shaft 1 and the sliding face 22 of the outer shaft 2 corresponds to the internal face of said shaft 2. The male grooves 23 and the female grooves 24 have curved profiles with a certain play so that in the case of balls 3 being lost, the torque may still be transmitted between the inner shaft 1 and the outer shaft 2.

As illustrated in FIGS. 4 and 11, the balls 3 are deposited in a first axial row 20, with the inner shaft 1 which is provided with an axial groove 31 or 51, and the outer shaft 2 which is provided with an axial groove 32 or 52. A second axial ball 3 row 19 is diametrically opposite to the first axial row 20 of balls 3, and it is directly supported in an axial groove 32 of the outer shaft 2.

In another embodiment of the invention shown in FIG. 11A and relating to FIGS. 4 and 11, the balls are deposited in two diametrically opposite rows 20, 20'. The inner shaft 1 is provided with two diametrically opposite axial grooves 51, 51' and the outer shaft 2 is provided with two diametrically opposite axial grooves 52, 52'. It should be noted that FIG. 11A shows the grooves arranged so that the rails are installed in the outer shaft. The two diametrically opposite rows of balls with the corresponding grooves can also be arranged so that the rails install in the inner shaft similar to how the rails and grooves are arranged in FIG. 4.

In another embodiment of the invention illustrated in FIGS. 3, 5, 9, 15, 17 and 18, the balls 3 are deposited in three axial rows 20 which are arranged transversely at 120° with respect to each other. The inner shaft 1 is provided with three axial grooves 31, 51 which are arranged transversely at 120° with respect to each other. The outer shaft 2 is provided with three axial grooves 32, 52 which are arranged transversely at 120° with respect to each other.

In embodiments not shown in the figures, the elastic members 70 or 80 are arranged with some in the inner shaft 1 and others in the outer shaft 2; the elastic members 70, 80 pushing the two corresponding rails 45 or 65, which cooperate with the relevant shaft 1, 2. In order to mount the system and as illustrated in FIG. 6, the rails 45 used for compressing the springs 70 generate play between the balls 3 and the rails 45. Once mounted, the rails 45 are released, and the rails 45 are pushed by the springs 70, the system is set into place thereby allowing compensation for the play due to manufacturing tolerances.

As illustrated in FIG. 5, the rails 45 pivot around an axis of rotation which corresponds to the center of the balls 3, this axis is parallel to the common axis 4 of both shafts 1 and 2. The rails 45 are set into place when they come into contact with the surfaces laid out in the shaft 2 via the balls 3. In this step, both shafts 1 and 2 may slide relatively to each other via balls 3 which gives the possibility of obtaining a relatively weak sliding force.

As illustrated in FIG. 10, during the transmission of a torque 14 around a common axis 4 to the shaft 1 and to the tube 2, a tangential force 11 given by the fictitious lever arm 16 generates a normal force 12 between the shaft 2 and the ball 3. This normal force 12 in turn generates a force 13 between the rail 45 and the shaft 1 by passing through the ball and rail contact. In order to allow the system to have torque transmission without any movement, the force 13 has to be comprised in a friction cone 15 resulting from the contact between the shaft and the rail.

During the service life of the vehicle, the fatigue of the spring will have less impact on present system since it is not taken into consideration during transmission of the torque, accordingly the stiffness of the coupling device will lose less stiffness.

What is claimed is:

1. A coupling device comprising:
    an inner shaft and an outer shaft sliding along a common axis and each having a concave portion;
    balls arranged within said concave portion of said inner and outer shafts; each of said balls having a center, a common median plane passing through the common axis and through the center of each of said balls;
    one said concave portion of one said shafts having a bottom and two flanks located on either side of the common median plane, each of the two flanks having a circular cross-section, a center of said circular cross-section being located at a distance from the center of each of the balls between said common axis and the center of each of the balls and closer to the bottom than the center of each of the balls; and
    two rails located on either side of the common median plane, wherein each of the two rails has a first bearing face in mating contact with the balls and a second bearing face in mating contact with a respective one of the flanks.

2. The coupling device of claim 1, wherein said first bearing face is concave.

3. The coupling device of claim 1, wherein each of said second bearing face of each said rails is convex.

4. A coupling device comprising:
    at least two shafts, one shaft being an inner shaft, and another shaft being an outer shaft, said shafts sliding along an axial direction of a common axis of the shafts;
    balls arranged between the inner shaft and the outer shaft, each of said balls being arranged in a concave portion of the inner shaft, and in a concave portion of the outer shaft;
    the concave portion of the inner shaft and the concave portion of the outer shaft having a common median plane, said common median plane aligning with a center of said balls and the common axis of the shafts;
    one concave portion of one of said shafts arranged to receive two rails on either side of the common median plane, each rail pushed by an elastic member against the balls, the balls bearing directly against the other one of the said shafts;
    the concave portion of said one of said shaft arranged to receive said two rails including a bottom and two flanks on either side of the common median plane, each said flank having a circular cross-section with a center; and
    said center of each said circular cross-section located on the common median plane, closer to said bottom than the center of each of said balls,
    each of the two rails being parallel to the common axis and having a first bearing face in mating contact with the balls and a second bearing face in mating contact with a respective one of the flanks, said location of said center of the circular cross-section preventing said rails from escaping the concave portion.

5. The coupling device of claim 4, wherein, when torque is transmitted, a force transmitted between the rail and a corresponding flank is located inside a friction cone.

6. The coupling device of claim 4, wherein the concave portion of said one of the shafts comprises a bulge outside each of the flanks.

7. The coupling device of claim 4, further comprising male grooves and female grooves with curved profiles on the inner shaft and on the outer shaft; and wherein said grooves transmit torque between the inner shaft and the outer shaft in case of failure of the balls.

8. The coupling device of claim 4, wherein said one of said shafts is the inner shaft.

9. The coupling device of claim 4, wherein said one of said shafts is the outer shaft.

10. The coupling device of claim 4, wherein said first bearing face is concave.

11. The coupling device of claim 4, said second bearing face is convex.

12. A mechanism comprising:
    an inner shaft and an outer shaft sliding along a common axis and at least one coupling interface comprising:
    a first axial groove in one of said inner and outer shafts;
    a second axial groove in the other of said inner and outer shafts, said second groove facing said first groove;
    balls having a center and arranged between the first groove and the second groove;
    two rails arranged on either side of the balls and contacting the first groove;
    elastic members in said first groove pushing said two rails against said balls;
    said first groove having two flanks with a circular cross-section said flanks located on either side of said balls;
    a center of said circular cross-section of said flanks is located between the center of said balls and said common axis,
    each of the two rails being parallel to the common axis and having a first bearing face in mating contact with the balls and a second bearing face in mating contact with a respective one of the flanks.

13. The mechanism of claim 12, wherein the second groove has a section which includes two concave faces tilted with respect to each other;
    and said two concave faces contact the balls.

14. The mechanism of claim 12, wherein:
    the bottom has two bearing faces inclined with respect to one another, each bearing face extends on a different corresponding side of the common median plane and is perpendicular to one of the flanks located on a corresponding side of the common median plane.

15. The mechanism of claim 14, wherein:
    each elastic member includes two axial bars, each bar located on different corresponding sides of a common median plane; and
    each of said bars bears upon a corresponding one of the two faces of a bottom of said first groove.

16. The mechanism of claim 15, wherein:
    the elastic member is made of metal;
    the axial bars of the elastic member are tilted with respect to each other;
    each of the axial bars has elastic tabs which push the corresponding rail;
    each of the axial bars has an attachment member at each axial end.

17. The mechanism of claim 15, wherein:
the elastic member is made of an elastic material;
the axial bars of the elastic member are tilted with respect to each other;
each axial bar has an axial bulge, said bulge pushing a corresponding rail.

18. The mechanism of claim 12, wherein: said mechanism has one coupling interface; and further comprising an axial row of balls diametrically opposite to the row of balls of said one coupling member and directly supported in an axial groove of the inner shaft and in an axial groove of the outer shaft.

19. The mechanism of claim 12, wherein the at least one coupling interface consists of two diametrically opposite coupling interfaces.

20. The mechanism of claim 12, wherein the at least one coupling interface consists of three coupling interfaces arranged at 120° with respect to each other.

21. The mechanism of claim 12, wherein said mechanism is an intermediate portion of a motor vehicle steering column.

22. The mechanism of claim 12 wherein said mechanism is an upper portion of a motor vehicle steering column.

23. A mechanism comprising:
an inner shaft and an outer shaft, said shafts sliding with respect to one another along an axial direction of a common axis of the shafts and at least one coupling interface, each comprising:
a first axial groove provided in one of the inner shaft and outer shaft;
a second axial groove provided in another of the inner shaft and the outer shaft, the second groove facing the first groove;
a row of balls arranged in an axial space between the first groove and the second groove, each of said balls having a center, a common median plane passing through the common axis and through the center of each of said balls;
two rails arranged on either side of the common median plane;
each of the two rails extending parallel to the common axis, each of the two rails contacting the first groove;
each of the two rails being pushed against each of said balls by an elastic member arranged in the first groove;
each of said balls moving against the second groove; wherein
the first groove includes a bottom and two flanks on either side of the common median plane, each of said flanks having a circular cross-section;
each rail has a cross-sectional profile including a first bearing face in contact with a matting spherical face of the balls, and a second bearing face in contact with one of the flanks;
a center of said circular section of said flanks is located on the common median plane at a distance from the centers of the balls and closer to said bottom than said centers of the balls.

* * * * *